UNITED STATES PATENT OFFICE.

BENJAMIN T. BROOKS AND FRED W. PADGETT, OF PITTSBURGH, PENNSYLVANIA, ASSIGNORS TO GULF REFINING COMPANY, OF PITTSBURGH, PENNSYLVANIA, A CORPORATION OF TEXAS.

PAINT COMPOSITION.

1,197,599.  Specification of Letters Patent.  Patented Sept. 12, 1916.

No Drawing.   Application filed August 10, 1914.   Serial No. 855,981.

*To all whom it may concern:*

Be it known that we, BENJAMIN T. BROOKS and FRED W. PADGETT, both citizens of the United States, residing, respectively, at Pittsburgh, Allegheny county, State of Pennsylvania, have invented certain new and useful Improvements in Paint Compositions; and we do hereby declare the following to be a full, clear, and exact description of the invention, such as will enable others skilled in the art to which it appertains to make and use the same.

This invention relates to certain improvements in paint compositions intended principally for use in connection with the painting of surfaces of cement and concrete, wherein the free lime present exerts a saponifying action upon the oleaginous vehicle usually employed in compounding the paint, with the result that the paint layer after being applied to the concrete or cement surface loses adhesion thereto and tends to peel off.

In accordance with the present invention, we employ as the oil constituent or vehicle of the paint compositions a non-saponifiable acid-free hydrocarbon capable of absorbing oxygen with the formation of a "dry" film, i. e., a film such as is given by linseed oil. Such a hydrocarbon may be prepared by introducing olefin groups into a hydrocarbon oil of sufficiently high boiling point not to be too volatile, or by removing the acid or carboxyl group from a drying oil, such as linseed or china-wood oil.

In preparing the non-saponifiable hydrocarbon product from petroleum, we preferably select a petroleum of the grade known commercially as "Solar" oil, that is to say, petroleum of a grade intermediate between the more costly lubricating oil and the more volatile kerosene, and which has a boiling point higher than approximately 250° C. In the treatment of such a petroleum we first chlorinate it, with a the formation of a dichlorid, and with hydrochloric acid as by a by-product, and we then dissociate the dichlorid at a high temperature (say from 350° C. to 550° C.) preferably in the presence of a catalyst such as barium chlorid, the operation being also preferably conducted *in vacuo*, with or without the dilution of the vapors by an inert gas or vapor such as nitrogen or steam. The dissociation of the dichlorid results in the obtaining of an additional amount of hydrochloric acid as a by-product and the production of a non-volatile diolefin hydrocarbon, which exhibits no appreciable evaporation loss upon setting to a hard film, and which is therefore appropriate as a substitute for linseed oil and the like in the manufacture of paint compounds.

When the non-saponifiable hydrocarbon is to be produced from a drying oil, such as linseed oil, china-wood oil, or the like, its production may take place in accordance with any one of a number of different ways. For instance, a lime salt or soap may be distilled preferably *in vacuo* (say 20 mm.) with free lime, in accordance with the equation:

1. 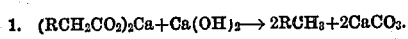

Or, an aqueous solution of an alkali soap (potash or soda soap) may be electrolyzed, according to the following equation:

2. 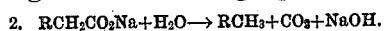

Or, free linseed acids may be distilled and brought into contact with a catalyst (such as manganous oxid, ferric oxid, or alumina) at high temperatures, as, for instance, 400° C. to 500° C., according to the equation:—

3. 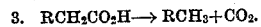

In the three foregoing equations, the symbol R refers to a hydrocarbon radical containing two olefin bonds.

The non-saponifiable, non-volatile, unsaturated hydrocarbon product obtained either from petroleum or from a drying oil, may be compounded with a paint pigment, in such manner as to make up a paint composition appropriate for use as a surface coating. As thus compounded, the resultant paint mixture may be applied to concrete and cement surfaces in the usual manner, with the assurance that any free lime contained in the concrete or cement cannot affect the vehicle or "body" of the paint. Moreover, the said vehicle for the paint, being acid-free, will itself be neutral to the surface to which it is applied, and to the paint pigment, and will consequently introduce no disturbing complications either in the manufacture of the paint composition or in its application as a coating either to concrete or to other surfaces.

What we claim is:

1. A paint composition having as its vehicle a non-saponifiable non-volatile hydrocarbon drying oil; substantially as described.

2. A paint composition having as its vehicle an unsaturated non-saponifiable film-forming hydrocarbon drying oil; substantially as described.

In testimony whereof we affix our signatures, in presence of two witnesses.

BENJAMIN T. BROOKS.
FRED W. PADGETT.

Witnesses for B. T. Brooks:
 DAVID B. DAY;
 RUSSELL J. BURT.

Witnesses for Fred W. Padgett:
 M. C. MOORE,
 C. H. HARBISON.